Sept. 19, 1950         F. E. HAGEMAN         2,522,511
                          BEEHIVE
Filed Aug. 30, 1948                        2 Sheets-Sheet 1
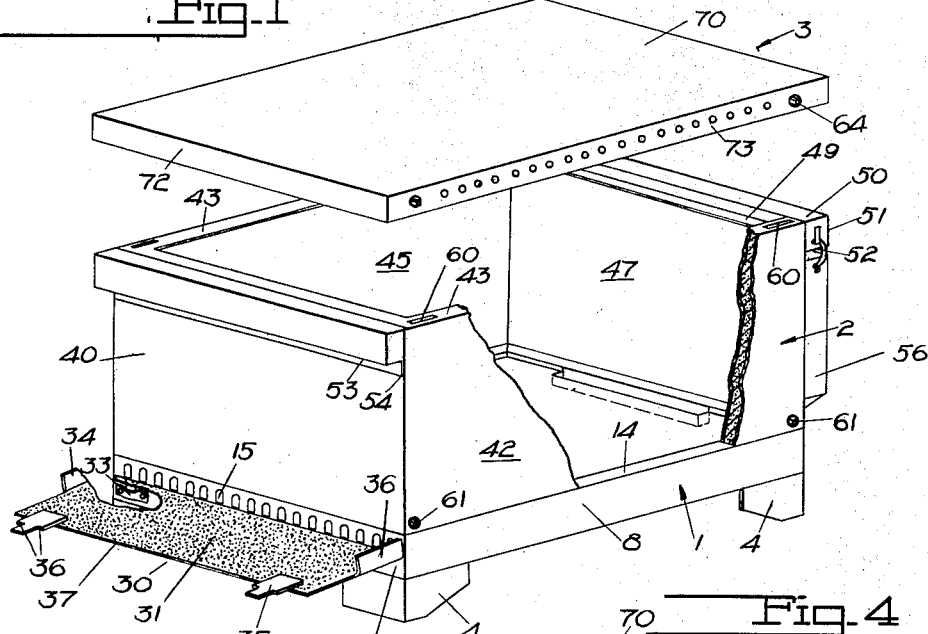
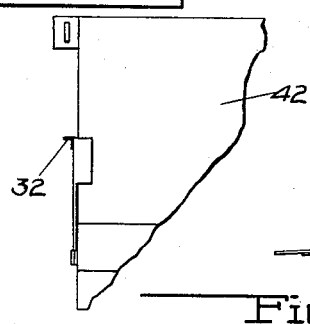
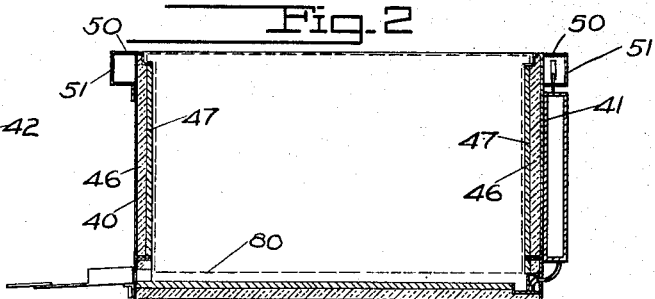
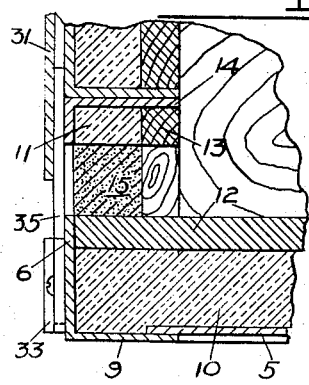
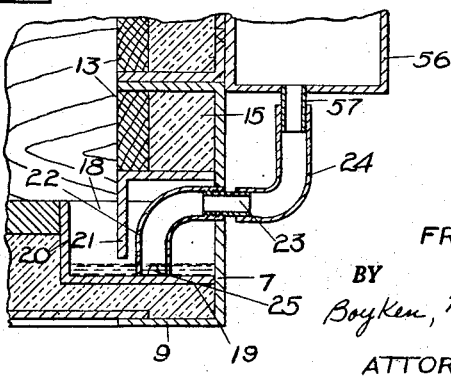
INVENTOR.
FRANK E. HAGEMAN
BY
Boyken, Mohler & Beckley
ATTORNEYS Sept. 19, 1950  F. E. HAGEMAN  2,522,511
BEEHIVE
Filed Aug. 30, 1948  2 Sheets-Sheet 2
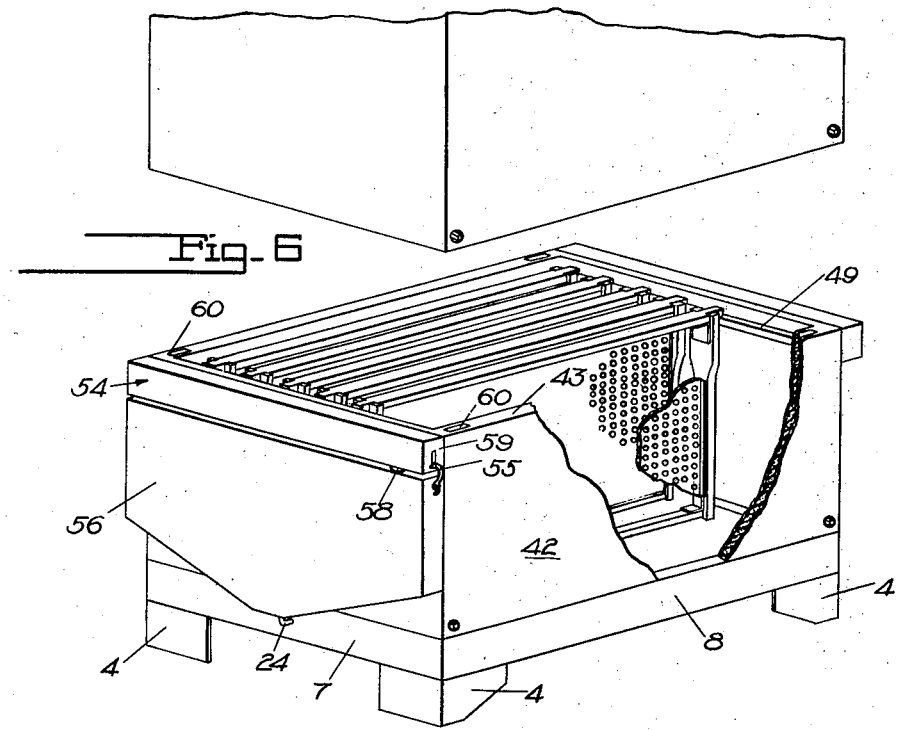
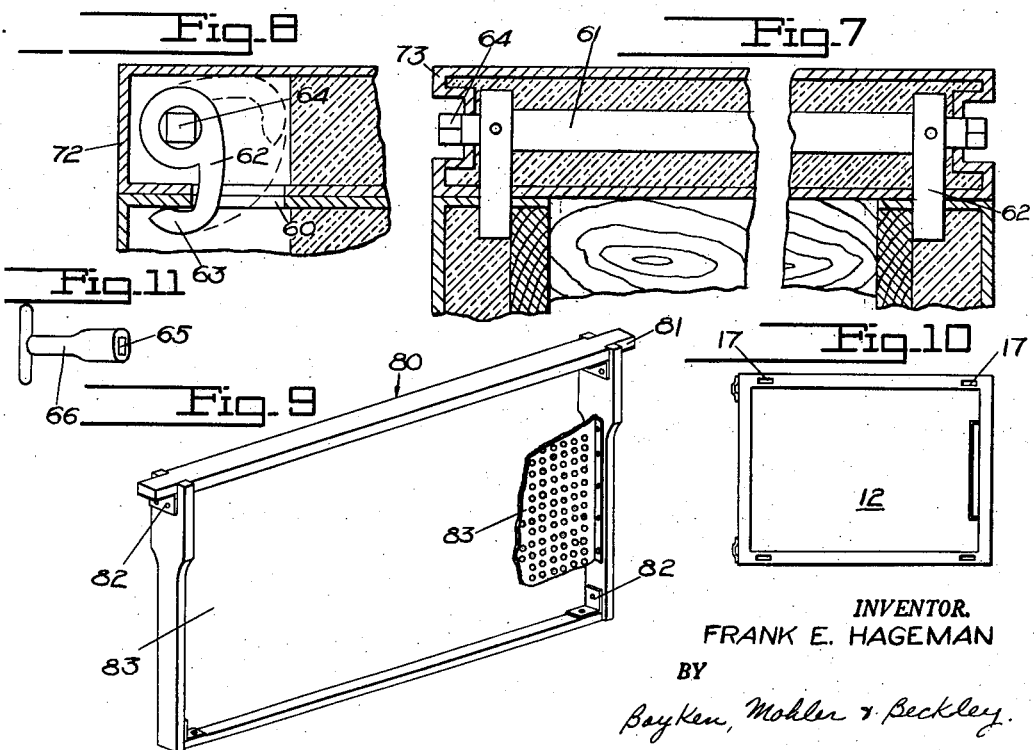
INVENTOR.
FRANK E. HAGEMAN
BY
Bay Ken, Mohler & Beckley.
ATTORNEYS Patented Sept. 19, 1950

2,522,511

UNITED STATES PATENT OFFICE 2,522,511

BEEHIVE

Frank E. Hageman, Chico, Calif.

Application August 30, 1948, Serial No. 46,810

12 Claims. (Cl. 6—1)

This invention relates to beehives, and has for one of its objects the provision of a hive that is more desirable than heretofore, and that provides better protection for the bees in summer and in winter than heretofore, and that is fireproof.

Another object of the invention is the provision of improved means for feeding the bees during those periods when artificial feeding is required, such as those periods when the bees are being moved from one locality to another and when there is no material source of food available.

An additional object of the invention is the provision of means for locking the different parts of the hive together to prevent unauthorized access to the brood chamber or hive body and to prevent predatory animals from robbing the hives.

A still further object of the invention is the provision of an improved removable alighting or landing board for each hive, thus enabling the hives to be relatively closely packed for transporting, and which alighting or landing board is adapted to function as a closure or partial closure for the entrances into the hives during transportation of the hives.

Another object of the invention is the provision of improved structure in a hive for ventilating the same and for preventing access thereto by lizards, rodents and other undesirable forms of life.

Other objects and advantages will appear in the description and in the drawings, such, for instance, as improved means to facilitate the securement of hive bodies in superposed relationship, in which the locking means for locking the hive cover and bottom board of each hive to the hive body is employed. Also the provision of legs in the bottom board instead of the usual foundation, is a desirable improvement.

Heretofore beehives have been made of wood, with the result that they weather badly, and warpage may open undesirable cracks as well as opening or closing the entrance for the bees to an objectionable degree. Furthermore, wooden hives are highly inflammable and the ordinary hive is easily robbed by unscrupulous persons or by animals, such as bears in those localities where bears exist.

Attempts to make metal hives have heretofore been unsuccessful. Bees will not alight on metal nor will they traverse metal on the bottom and side walls within the hive, although they will readily feed from syrup in a metal trough.

The present invention overcomes the above objections to conventional hives and to hives of metal.

In the drawings, Fig. 1 is an isometrric view of a hive with the hive cover elevated and with one of the side walls and the landing board broken away to show structure.

Fig. 2 is a reduced size vertical sectional view taken through a hive longitudinally thereof with the hive cover removed.

Fig. 3 is a fragmentary elevational view of one corner of a hive body as seen from one side of the body at the entrance end showing the landing board in position partially covering the entrance openings.

Fig. 4 is an enlarged sectional view through the hive cover with said cover partially broken in length.

Fig. 5 is an enlarged fragmentary sectional view (partially broken in length) of the bottom portion of a hive showing the feeding trough and system at one end of the hive and one of the entrance openings at the other end with the landing board in a position partially covering the entrance opening.

Fig. 6 is an isometric view of a hive body on a bottom board as seen from the end carrying the syrup reservoir and with a portion of a hive body above the one that is on the bottom board preparatory to making it a super body secured over the lower one. One side wall of the lower hive body is broken away and in section, and a plurality of frames are shown suspended within the lower hive body.

Fig. 7 is an enlarged, fragmentary sectional view showing the locking device at one upper corner of the hive body.

Fig. 8 is an end elevational view of the locking device with the hive cover and hive body shown in section.

Fig. 9 is an isometric view of a frame ready for the wax foundation and showing the perforated sheet on which the foundation is to be formed.

Fig. 10 is a reduced size plan view of the bottom board only, exclusive of the landing board, showing the slots for the latch elements carried by the hive body.

Fig. 11 is a perspective view of a key for locking the hive body to the bottom board and for locking the hive cover to the hive body, or for locking hive bodies or supers in superposed relationship together.

In detail, the basic hive unit comprises a rectangular bottom board 1, a rectangular hive body or brood chamber 2 supported on said bottom board and separable therefrom, and a hive cover 3 adapted to be removably supported on the hive body 2 closing the upper side of the latter. The foregoing elements are generally identified, having specific structure as will appear later on, it being understood however, that the detailed description and the precise details shown in the drawings are not intended to be restrictive of the invention, but are merely intended to show the preferred structure.

Bottom board

The bottom board 1 may have four legs 4, one at each corner depending therefrom, which legs may support each hive directly on the ground or on any other desired support.

The bottom board 1 comprises an outer horizontal metal wall 5 which may have upstanding flanges 6, 7 at opposite end edges and similar flanges 8 (only one being shown in Fig. 1) along the opposite side edges. These flanges may be integral with the bottom wall 5 or bottom wall 5 may merely be a panel as indicated in Fig. 5 supported at its marginal portions on portions 9 that extend inwardly from the lower edges of flanges 6, 7, 8.

Directly against the bottom metal wall 5 which includes the portions 9, is a layer of suitable heat and fire insulating material 10, such as the type made of glass fibers or any other suitable material that may be fireproof and have heat insulating properties.

A strip 11 of the same material as that of insulation 10 is directly against the inner sides of flanges 6, 7, 8.

Covering the bottom sheet 10 is a sheet 12 of plyboard and strips 13 of plyboard cover the inner sides of the strips 11. Extensions 14 of flanges 6, 7, 8 may extend over the upper exposed edges of strips 11, 13 and said extensions are parallel with the board 12.

The flanges 6, 7, 8, and strips 11, 13 project above the top surface of the bottom sheet 12 of plyboard, and the flange 6 and strips 11, 13 that are thereagainst are formed with a horizontal row of equally spaced passageways or openings 15. Each passageway is slightly larger than an individual bee so as to permit free passage of bees into and out of the hive, and it will be noted that the metal flange 6 is quite thin so that the bees are not required to touch the metal with their feet in passing into and out of the hive through the entrances provided by said passageways.

The extensions 14 that extend over the insulating and wooden strips that are adjacent flanges 8, are formed with slots 17 extending longitudinally of said flanges and each slot is adjacent each end of each of the flanges. These slots are to receive locking members that are carried by the hive body as will later be explained.

Along the flange 7 is a feeding trough terminating at its end a relatively short distance from the inner plyboard strips 13 that are along flanges 8. Said flange 7 may form one side of said trough, which has closed ends 18 and which trough has a horizontal flat bottom 19 and a relatively narrow vertical side wall 20 opposite flange 7, which side wall is spaced inwardly into the hive relative to the inner surface of the wooden strip 13 above the trough.

Spaced between side wall 20 and flange 7 is a depending partition strip 21 that extends almost to the bottom wall 19. The space between said strip 21 and side wall 20 is the space where the bees have access to a layer of syrup on said bottom wall, while between the partition 21 and flange 7 is the space where the syrup is fed into the feeder trough.

Syrup is fed into said trough through a short pipe 22 that extends from bottom wall 19 upwardly and then horizontally into an opening in flange 7. The end of the pipe 22 opening outwardly of flange 7 may be internally threaded for a plug, which will be substantially flush with the outer side of said flange, or for a short pipe nipple 23 that may project from flange 7 sufficiently for connecting one end of a flexible tube 24 thereto and which tube connects the nipple with a source of supply.

The lower end of the tube or pipe 22 is formed at opposite sides of its open end with notches or recesses 25 for discharge of syrup onto bottom 19 toward opposite ends thereof. The depth of said notches determines the depth of the syrup on bottom 19, and an automatic discharge of syrup will occur as the layer of syrup is taken up by the bees.

It will be seen from the foregoing that practically no space is taken up inside the hive by the feeder, and even where partitions may be used in a hive, the trough will extend past such partitions so as to service the bees in any portion of the hive. Bees cannot pass through the feeder trough from one side of such partition to the other. A partition is not shown, such structure being old, but when used, they extend between the end walls of the hive body upwardly from the bottom board.

From the foregoing structure it will be seen that the bottom board provides a structure in which the bees at no time will come in contact with objectionable metal and the said bottom wall is substantially fireproof from external fire, as well as being heat insulated. Only a fire of sufficient size to substantially ruin the metal walls of the hive would be sufficient to otherwise materially injure the bottom wall.

Landing or alighting board

The landing, or alighting board, as it is sometimes called, is carried by the bottom board, and is generally designated 30. This board is a generally horizontal strip of metal 31 that is formed with a pair of lugs 32 along one longitudinally extending edge, and which lugs project at right angles from the strip and to one side of the latter (Fig. 3). Each lug 32 is adapted to extend vertically downwardly into an upwardly opening recess adjacent each end of flange 6 for supporting the landing board horizontally with its upper side about even with the lower sides of the passageways 15. Said recesses are provided by short horizontal bracket strips 33 secured to the flange 6 adjacent the ends thereof. Each strip 33 is outwardly bower centrally between its ends (Figs. 1, 5,).

End marginal portions 34 of strips 33 may be turned upwardly, as seen in Fig. 1 when the board is supported horizontally on the bottom board, and said marginal portions are so positioned that the opposite sides of the hive body may be received between them if the landing board were positioned vertically against the end of said body.

Along the free edge of strip 31 that is remote from the hive body are a pair of extensions 35, each having a reduced outer end portion providing square shoulders 36 at the junctures between said reduced outer ends and the body of the extensions, and which shoulders are spaced from the adjacent free edge of strip 31.

Extensions 35 are adapted to be slipped into the same recesses that receive lugs 32 when the landing board is vertical, as seen in Fig. 3. When said landing board is in said vertical position the shoulders 36 function to support the board so that edge 37 of strip 31 will extend across the passageways 15 sufficiently low to prevent bees from entering or from leaving the hive, but the entrance passageways will be sufficiently open to provide for adequate ventilation and to permit the bees to see out in the event the landing board is used to partially close the entrances in the daytime.

The upper surface of the landing board is covered with any suitable heat insulation material such as a thin layer of wood, cork, etc., for the reason that the bees would injure their feet were they to alight on a metal landing board, which they ordinarily would not do in any event. Such injury would, of course, be due to the extensive heat if the metal were exposed to the sun.

It is pertinent to note that in conventional hives, the landing board is usually an integral extension of the bottom board and takes up considerable room. The above described removable landing board effectively prevents grass from clogging the hive entrance when in its normal horizontal position and creates a more compact hive when in a vertical position.

Hive body

The hive body of the present hive comprises opposite metal end walls 40, 41 and opposite side walls 42, all of metal, and each side wall has an inturned flange 43 along its upper and lower edges that are adapted to extend across the edges of a layer 44 of heat and fire insulation material that is thereby against the said metal walls, and an inner plyboard sheet 45 that forms the inner lining for each side and end wall. The insulation material and plyboard are identical with the corresponding materials used in bottom board 1.

The end walls 40, 41 each have a layer of heat and fire insulation material 46 on its inner side and an inner liner 47 of plyboard covers said material 46.

The inner plyboard liner 47 of each end wall terminates a short distance from the upper edges of end walls 40, 41 and of the insulation material 46, thus providing a square upwardly facing shoulder defined by the upper end edge of the plyboard end liners 47. This shoulder thus produced is covered by a metal strip 49 that then extends upwardly over the inner exposed opposed portions of the insulation material 46 and then horizontally over the upper edges of said insulation material 46 and walls 40, 41 projects outwardly of said walls 40, 41 as at 50 and then downwardly in opposed spaced relation to said walls 40, 41 respectively, as at 51, and then back to walls 40, 41 as at 52, the said portion 52 of each strip being secured to walls 40, 41 respectively in any suitable manner, as for example, by riveting or bolting a flange 53 of each portion 52 to the adjacent wall 40 and 41.

By the above structure a rectangular hollow projection extends longitudinally along the upper edge of each end wall 40, 41 providing an adequate hand grip for lifting the hive body by the hands. Said rectangular hollow projection is closed at each of its ends by end walls 59.

The above described hollow projection that is along the upper edge of end wall 41 is generally designated 54 (Fig. 6) and its opposite ends are about flush with the oppositely outwardly facing surfaces of the side walls. End walls 59 are vertically slotted, thus providing openings for the removable insertion of hooks or hangers 55 for suspending the ends of a flat feeder supply tank or container 56 from said projection 54. The container 56 is preferably flat so as to be wholly disposed below projection 54 within its downwardly projected area and the bottom of the container is generally V-shape with an outlet tube 57 (Fig. 5) at the apex of the V. This outlet tube is adapted to connect with the flexible tube 24 that in turn connects with the nipple 23. Syrup within said container is thus fed by gravity into the feeder trough that is carried by the bottom board.

The container 56 may be filled through an opening in its upper side that is closed by a cap 58 (Fig. 6). This cap makes a tight seal, hence the liquid level within the trough will be automatically held at a level determined by the vertical depth of the recesses 25 in the sides of the discharge pipe 22.

The flanges 43 at the upper ends of the metal side walls 42 are formed with slots 60 that are identical with slots 17 in the extensions 14 on flanges 8, and which slots are positioned in exactly the same places on flanges 43 as slots 60, except that they are on the upper edges of the side walls of the hive body instead of being on the bottom board.

A rod 61 rotatably extends through each end wall 40, 41 adjacent the lower edge, and each rod carries a latch member 62 of identically the same shape as the latch member 62 shown in Fig. 8. Rod 61 in Figs. 7, 8 are identical with the rods that are carried by the end walls.

The latch members 62 on each rod are adapted to swing into slots 17 in the extensions 14 when each of the rods is rotated in one direction, and the hooked ends 63 (Fig. 8) of each element will engage under the extensions 14 adjacent the slots 17 when so rotated. Each rod has a square end 64 that is exposed within an outwardly-opening recess in one of the side walls 42 for engagement by the sides of an outwardly opening rectangular recess 65 in one end of a key 66 (Fig. 11).

By the above means the hive body may be securely locked to the bottom board. The ends of rods 61 do not project outwardly of the side walls. Therefore, they do not interfere with the close packing of hives, and there is no danger of breaking or bending the rods during handling of the hives.

The fibre glass insulation strips in the bottom board is recessed at the slots to permit the latch elements to freely pass into said slots, and the lower edges of the end walls adjacent the latches are also slotted in a manner similar to that shown in Fig. 8 for swinging of the latches into said end walls.

The foregoing description of the hive body is, of course, applicable in all respects to any supers which may be used in conjunction with a hive body.

Hive cover

The hive cover is rectangular and is hollow, having an upper metal wall 70 and a lower perforated wall 71 of metal. Metal strips 72 may connect the opposite end edges of the said walls and perforated metal strips 73 connect the longitudinal edges of said walls.

Fibrous fire and heat insulation material 74 fills the space between walls 70, 71, which material is sufficiently porous to permit ventilation and evaporation of moisture from the hive body through the perforations of lower wall 71 and through the perforations in strips 73.

Rods 61 are rotatably supported with the cover extending parallel with the rods 61 that are in the end walls of the hive cover, (Figs. 7, 8). Said rods carry latch members 62 having hooked outer ends 63. Square ends 64 are exposed in outwardly opening recesses 75 (Fig. 7) in one of the strips 73 for engagement by key 66 for rotating the rods.

Upon rotation of said rods 61 the latches will be swung from a dotted position 76 (Fig. 8) within the cover to full line position for engagement of the hooked ends below the flanges 43 adjacent slots 60 thereby securely locking the hive covers to the hive body.

The frames

Within the hive body the rectangular frames, generally designated 80, are suspended by extensions 81 (Fig. 9) of one of the sides of each frame, which extensions are adapted to be supported on the shoulders 49 on the end walls of the hive body. A frame is indicated in Fig. 2 by dash lines.

All four corners of the rectangular frame are braced by corner pieces 82 thus preventing breakage or damage to the frames as is very frequent in handling the frames when they are loaded with honey.

It is customary in frames to use wire foundations on which the start of the wax cells are formed, but in the present invention the foundation is of perforated sheet metal 83 which greatly strengthens the frame and resists distortion of the same. The perforated sheet is pre-covered with wax in the usual manner, for starting the cells, which the bees will follow in building up the comb.

The hive generally

By the structure hereinbefore described, it will be seen that the hive is extremely strong and practically weather proof as well as being fireproof and insulated against entrance of heat and cold.

In transporting bees from one locality to another or during normal use, the hive bodies and supers may be stacked one above the other in intercommunicating relationship. The hive bodies and supers may be locked together as by the same locking means used for locking the hive bodies to the covers and bottom boards. Feeding may be done in the same manner, except that the lower board in each stack may carry the feeder, and the landing boards may be positioned vertically over the entrances to partially close the latter.

The legs 4 may, if desired, be removable from the bottom boards, and the hives may be handled as complete units for stacking without removing the bottom boards and hive covers.

It is pertinent to note that the locking together of the hive bodies, supers, covers and bottom boards not only makes handling of the hives easier, but tends to prevent robbery of the contents by unauthorized persons or animals. In the latter instance, the protection is positive.

I claim:

1. In a hive including a bottom board and a hive body having walls extending upwardly from the said bottom board, a feeder within said body comprising a trough extending horizontally along one of said walls, a supply conduit for syrup opening into said trough at one end thereof and outwardly of said body at the other end, and a reservoir carried by said body outside the latter connected with said other end of said conduit above the latter and at a level above said one end for supplying syrup to said trough by gravity, said trough having a relatively wide, substantially horizontally disposed bottom wall, the portion of said conduit having said one end being an upwardly extending tube with said one end closely adjacent said bottom wall.

2. In a hive including a bottom board and a hive body having walls extending upwardly from the said bottom board, a feeder within said body comprising a trough extending horizontally along one of said walls, a supply conduit for syrup opening into said trough at one end thereof and outwardly of said body at the other end, and a reservoir carried by said body outside the latter connected with said other end of said conduit above the latter and at a level above said one end for supplying syrup to said trough by gravity, said trough having a relatively wide, substantially horizontally disposed bottom wall, the portion of said conduit having said one end being an upwardly extending tube with said one end closely adjacent said bottom wall and directed toward the latter, the sides of said tube around said open end being formed with laterally directed openings for said syrup.

3. In a hive including a bottom board and a hive body having walls extending upwardly from the said bottom board, a feeder within said body comprising a trough extending horizontally along one of said walls, a supply conduit for syrup opening into said trough at one end thereof and outwardly of said body at the other end, and a reservoir carried by said body outside the latter connected with said other end of said conduit above the latter and at a level above said one end for supplying syrup to said trough by gravity, said trough having a relatively wide, substantially horizontally disposed bottom wall, the portion of said conduit having said one end being an upwardly extending tube with said one end closely adjacent said bottom wall and substantially centrally between the ends of said trough and spaced substantially centrally between the longitudinal edges of said bottom wall.

4. In a hive including a bottom board and a hive body having walls extending upwardly from the said bottom board, a feeder within said body comprising a trough extending horizontally along one of said walls, a supply conduit for syrup opening into said trough at one end thereof and outwardly of said body at the other end, and a reservoir carried by said body outside the latter connected with said other end of said conduit above the latter and at a level above said one end for supplying syrup to said trough by gravity, said trough including side walls extending longitudinally of said bottom wall and upwardly from its longitudinal edges, and a partition wall spaced between said side walls extending parallel therewith and spaced slightly above the said bottom wall and along the side of said one end of said conduit that is nearest the center of the hive body.

5. In a hive including a bottom board and a hive body, having a pair of opposed end walls and a pair of opposed side walls extending upwardly from said bottom board, a horizontally extending ledge member projecting outwardly of the outer side of each of said end walls and along the upper edge thereof providing hand grips for lifting said hive body, a reservoir for syrup adjacent the outer side of one of said end walls and below the ledge member thereon, means for detachably securing said reservoir to said ledge member for suspending the reservoir therefrom, a feeding trough within said hive along said bottom board and a conduit for syrup connecting said reservoir with said trough for feeding syrup to the trough by gravity.

6. In a hive including a bottom board and a hive body, having a pair of opposed end walls and a pair of opposed side walls extending upwardly from said bottom board, a horizontally extending ledge member projecting outwardly of the outer side of each of said end walls and along the upper edge thereof providing hand grips for lifting said hive body, a reservoir for syrup adjacent the outer side of one of said end walls and below the ledge member thereon, means for detachably securing said reservoir to said ledge member for suspending the reservoir therefrom, a feeding trough within said hive along said bottom board and a conduit for syrup connecting said reservoir with said trough for feeding syrup to the trough by gravity, said reservoir being disposed within the downwardly projected area of the ledge member thereabove.

7. In a hive including a bottom board and a hive body, having a pair of opposed end walls and a pair of opposed side walls extending upwardly from said bottom board, a horizontally extending ledge member projecting outwardly of the outer side of each of said end walls and along the upper edge thereof providing hand grips for lifting said hive body, a reservoir for syrup adjacent the outer side of one of said end walls and below the ledge member thereon, means for detachably securing said reservoir to said ledge member for suspending the reservoir therefrom, a feeding trough within said hive along said bottom board and a conduit for syrup connecting said reservoir with said trough for feeding syrup to the trough by gravity, said end walls and said side walls and bottom walls being of metal with a wooden liner facing into the hive, and said ledge members being hollow and integral with the metal of said walls.

8. In a hive including a bottom board and a hive body having a pair of opposed side walls extending upwardly from said bottom board, said bottom board and said walls each comprising a wooden liner facing into the hive forming the inner surfaces thereof and a metal outer covering, a feeding trough within said hive and along said bottom board adjacent one of said walls, said trough having an elongated horizontally disposed bottom wall positioned substantially below the inner surface of said bottom board and having its upper side flush with said inner surface.

9. In a hive including a bottom board and a hive body having a pair of opposed side walls extending upwardly from said bottom board, said bottom board and said walls each comprising a wooden liner facing into the hive forming the inner surfaces thereof and a metal outer covering, a feeding trough within said hive and along said bottom board adjacent one of said walls, said trough having an elongated horizontally disposed bottom wall positioned substantially below the inner surface of said bottom board and having its upper side flush with said inner surface, said bottom wall of said trough having a width substantially greater than the thickness of said one wall and extending inwardly of said hive from the metal outer covering of said one wall.

10. In a hive including a bottom board and a hive body having a pair of opposed side walls extending upwardly from said bottom board, said bottom board and said walls each comprising a wooden liner facing into the hive forming the inner surfaces thereof and a metal outer covering, a feeding trough within said hive and along said bottom board adjacent one of said walls, said trough having an elongated horizontally disposed bottom wall positioned substantially below the inner surface of said bottom board and having its upper side flush with said inner surface, said bottom wall of said trough having a width substantially greater than the thickness of said one wall and extending inwardly of said hive from the metal outer covering of said one wall, a partition extending downwardly into said trough from said one wall for longitudinally dividing said trough.

11. In a hive including a bottom board and a hive body having a pair of opposed side walls extending upwardly from said bottom board, said bottom board and said walls each comprising a wooden liner facing into the hive forming the inner surfaces thereof and a metal outer covering, a feeding trough within said hive and along said bottom board adjacent one of said walls, said trough having an elongated horizontally disposed bottom wall positioned substantially below the inner surface of said bottom board and having its upper side flush with said inner surface, a supply conduit for syrup opening into said trough at one end thereof and outwardly of said body at the other end, said one end of said conduit being closely adjacent said bottom wall and positioned outwardly of the inner surface of said one wall.

12. In a hive including a bottom board and a hive body having a pair of opposed side walls extending upwardly from said bottom board, said bottom board and said walls each comprising a wooden liner facing into the hive forming the inner surfaces thereof and a metal outer covering, a feeding trough within said hive and along said bottom board adjacent one of said walls, said trough having an elongated horizontally disposed bottom wall positioned substantially below the inner surface of said bottom board and having its upper side flush with said inner surface, a supply conduit for syrup opening into said trough at one end thereof and outwardly of said body at the other end, said one end of said conduit being closely adjacent said bottom wall and positioned outwardly of the inner surface of said one wall, and being formed with laterally directed openings for syrup, said openings extending upwardly from said one end a distance substantially equal to the desired depth of the syrup in said trough.

FRANK E. HAGEMAN.

REFERENCES CITED

The following references are of record in the file of this patent:

UNITED STATES PATENTS

| Number | Name | Date |
|---|---|---|
| 855,175 | Hershiser | May 28, 1907 |
| 945,642 | Toth | Jan. 4, 1910 |
| 1,022,762 | White | Apr. 9, 1912 |
| 1,414,393 | Bamberger | May 2, 1922 |
| 1,426,701 | Achenbach | Aug. 22, 1922 |
| 1,455,459 | Troilo | May 15, 1923 |
| 1,492,429 | Cottam | Apr. 29, 1924 |
| 1,523,318 | Utton | Jan. 13, 1925 |
| 2,292,110 | Evans | Aug. 4, 1942 |
| 2,449,348 | Volgenau et al. | Sept. 14, 1948 |